United States Patent [19]
Gordon

[11] Patent Number: 5,398,253
[45] Date of Patent: Mar. 14, 1995

[54] STORAGE UNIT GENERATION OF REDUNDANCY INFORMATION IN A REDUNDANT STORAGE ARRAY SYSTEM

[75] Inventor: David W. Gordon, Boulder, Colo.

[73] Assignee: EMC Corporation, Hopkinton, Mass.

[21] Appl. No.: 892,228

[22] Filed: Jun. 2, 1992

Related U.S. Application Data

[63] Continuation-in-part of Ser. No. 849,511, Mar. 11, 1992, abandoned.

[51] Int. Cl.⁶ ............................................. G06F 11/10
[52] U.S. Cl. .................................. 371/40.4; 371/10.1; 395/575
[58] Field of Search ................. 371/10.1, 11.1, 40.1, 371/40.4; 395/575

[56] References Cited

U.S. PATENT DOCUMENTS

| | | | |
|---|---|---|---|
| 4,270,154 | 5/1981 | Crawford | 360/98 |
| 5,088,081 | 2/1992 | Farr | 371/10.1 |
| 5,124,987 | 6/1992 | Milligan et al. | 371/10.1 |
| 5,191,584 | 3/1993 | Anderson | 371/51.1 |
| 5,210,860 | 5/1993 | Pfeffer et al. | 395/575 |
| 5,235,601 | 8/1993 | Stallmo et al. | 371/40.1 |
| 5,265,098 | 11/1993 | Mattson et al. | 371/11.1 |

FOREIGN PATENT DOCUMENTS

| | | |
|---|---|---|
| 0371243A2 | 10/1989 | European Pat. Off. . |
| 0426185A2 | 11/1990 | European Pat. Off. . |
| 2649222 | 6/1990 | France . |
| WO9215057 | 9/1992 | WIPO . |

OTHER PUBLICATIONS

Wilson, et al., "Shrinking Drives Push Controller Integration," Computer Design, 30 (1991) Jun. 1, No. 9, Tusla, Okla.

Michael Anderson, "Raid 5 Architecture Provides Economical Failsafe Disk Storage," Electrical Design News, 36 (1991) Jun. 6, No. 12, Newton, Mass.

IBM Technical Disclosure Bulletin, vol. 33, No 8, Jan. 1991, "Using Dual Actuator Shared Data Direct Access Storage Devices Drives in a Redundant Array".

IBM Technical Disclosure Bulletin, vol. 32, No. 7, Dec. 1989, "Performance Assist For Checksum DASD".

IBM Technical Disclosure Bulletin, vol. 33, No. 6B, Nov. 1990, "Use of Non-Volatile Semiconductor Storage For Disk Array Parity".

Primary Examiner—Charles E. Atkinson
Attorney, Agent, or Firm—Spensley Horn Jubas & Lubitz

[57] ABSTRACT

A redundant array based data storage system used in computer systems for reducing the amount of time required to modify data records stored in the redundant array. The storage system reduces the number of transmissions between a storage unit within the redundant array and the array controller by incorporating a parity storage unit which is programmed to perform operations necessary to the calculation of a "parity code" which is used for error detection and correction. By integrating the redundancy information generation into the storage unit used to store the parity information, the number of transmissions between various component parts of the system is reduced, and so the amount of time required to perform a "read-modify-write" operation is reduced. Disk-type parity units having more than one read/write head are used to further increase the performance of the storage system by reducing the disk rotational latency time.

44 Claims, 6 Drawing Sheets

STORAGE UNIT GENERATION OF REDUNDANCY INFORMATION IN A REDUNDANT STORAGE ARRAY SYSTEM

RELATED APPLICATION

This application is a continuation-in-part of application Ser. No. 07/849,511, of David Gordon, which application was filed Mar. 11, 1992, now abandoned, and is entitled STORAGE UNIT GENERATION OF REDUNDANCY INFORMATION IN A REDUNDANT STORAGE ARRAY SYSTEM.

BACKGROUND OF THE INVENTION

1. Field of the Invention

This invention relates to computer system data storage, and more particularly to a system for generating redundancy information in each redundancy data storage unit within a redundant array system.

2. Description of Related Art

A typical data processing system generally involves one or more storage units which are connected to a Central Processor Unit (CPU) either directly or through a control unit and a channel. The function of the storage units is to store data and programs which the CPU uses in performing particular data processing tasks.

Various types of storage units are used in current data processing systems. A typical system may include one or more large capacity tape units and/or disk drives (magnetic, optical, or semiconductor) connected to the system through respective control units for storing data.

However, a problem exists if one of the large capacity storage units fails such that information contained in that unit is no longer available to the system. Generally, such a failure will shut down the entire computer system.

The prior art has suggested several ways of solving the problem of providing reliable data storage. In systems where records are relatively small, it is possible to use error correcting codes which generate ECC syndrome bits that are appended to each data record within a storage unit. With such codes, it is possible to correct a small amount of data that may be read erroneously. However, such codes are generally not suitable for correcting or recreating long records which are in error, and provide no remedy at all if a complete storage unit fails. Therefore, a need exists for providing data reliability external to individual storage units. Other approaches to such "external" reliability have been described in the art. A research group at the University of California, Berkeley, in a paper entitled "A Case for Redundant Arrays of Inexpensive Disks (RAID)", Patterson, et al., Proc. ACM SIGMOD, June 1988, has catalogued a number of different approaches for providing such reliability when using disk drives as failure independent storage units. Arrays of disk drives are characterized in one of five architectures, under the acronym "RAID" (for Redundant Arrays of Inexpensive Disks).

A RAID 1 architecture involves providing a duplicate set of "mirror" storage units and keeping a duplicate copy of all data on each pair of storage units. While such a solution solves the reliability problem, it doubles the cost of storage. A number of implementations of RAID 1 architectures have been made, in particular by Tandem Corporation.

A RAID 2 architecture stores each bit of each word of data, plus Error Detection and Correction (EDC) bits for each word, on separate disk drives. For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is Written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

An obvious drawback of such a system is the large number of disk drives required for a minimum system (since most large computers use a 32-bit word), and the relatively high ratio of drives required to store the EDC bits (7 drives out of 39). A further limitation of a RAID 2 disk drive memory system is that the individual disk actuators are operated in unison to write each data block, the bits of which are distributed over all of the disk drives. This arrangement has a high data transfer bandwidth, since each individual disk transfers part of a block of data, the net effect being that the entire block is available to the computer system much faster than if a single drive were accessing the block. This is advantageous for large data blocks. However, this arrangement effectively provides only a single read/write head actuator for the entire storage unit. This adversely affects the random access performance of the drive array when data files are small, since only one data file at a time can be accessed by the "single" actuator. Thus, RAID 2 systems are generally not considered to be suitable for computer systems designed for On-Line Transaction Processing (OLTP), such as in banking, financial, and reservation systems, where a large number of random accesses to many small data files comprises the bulk of data storage and transfer operations.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive OR'd" (XOR'd) to generate parity information. The resulting parity information is stored in a single redundant storage unit. If a storage unit fails, the data on that unit can be reconstructed onto a replacement storage unit by XOR'ing the data from the remaining storage units with the parity information. Such an arrangement has the advantage over the mirrored disk RAID 1 architecture in that only one additional storage unit is required for "N" storage units. A further aspect of the RAID 3 architecture is that the disk drives are operated in a coupled manner, similar to a RAID 2 system, and a single disk drive is designated as the parity unit.

One implementation of a RAID 3 architecture is the Micropolis Corporation Parallel Drive Array, Model 1804 SCSI, that uses four parallel, synchronized disk drives and one redundant parity drive. The failure of one of the four data disk drives can be remedied by the use of the parity bits stored on the parity disk drive.

Another example of a RAID 3 system is described in U.S. Pat. No. 4,092,732 to Ouchi.

A RAID 3 disk drive memory system has a much lower ratio of redundancy units to data units than a RAID 2 system. However, a RAID 3 system has the same performance limitation as a RAID 2 system, in that the individual disk actuators are coupled, operating in unison. This adversely affects the random access performance of the drive array when data files are small, since only one data file at a time can be accessed by the "single" actuator. Thus, RAID 3 systems are generally not considered to be suitable for computer systems designed for OLTP purposes.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block striping). A further aspect of the RAID 4 architecture is that a single storage unit is designated as the parity unit.

A limitation of a RAID 4 system is that Writing a data block on any of the independently operating data storage units also requires writing a new parity block on the parity unit. The parity information stored on the parity unit must be read and XOR'd with the old data (to "remove" the information content of the old data), and the resulting sum must then be XOR'd with the new data (to provide new parity information). Both the data and the parity records then must be rewritten to the disk drives. This process is commonly referred to as a "Read-Modify-Write" (RMW) sequence.

Thus, a Read and a Write on the single parity unit occurs each time a record is changed on any of the data storage units covered by a parity record on the parity unit. The parity unit becomes a bottle-neck to data writing operations since the number of changes to records which can be made per unit of time is a function of the access rate of the parity unit, as opposed to the faster access rate provided by concurrent operation of the multiple data storage units. Because of this limitation, a RAID 4 system is generally not considered to be suitable for computer systems designed for OLTP purposes. Indeed, it appears that a RAID 4 system has not been implemented for any commercial purpose.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage device containing parity for the N data blocks of the stripe. Further stripes each have a parity block, the parity blocks being distributed on different storage units. Parity updating activity associated with every modification of data in a redundancy group is therefore distributed over the different storage units. No single unit is burdened with all of the parity update activity.

For example, in a RAID 5 system comprising 5 disk drives, the parity information for the first stripe of blocks may be Written to the fifth drive; the parity information for the second stripe of blocks may be Written to the fourth drive; the parity information for the third stripe of blocks may be Written to the third drive; etc. The parity block for succeeding stripes typically "precesses" around the disk drives in a helical pattern (although other patterns may be used).

Thus, no single disk drive is used for storing the parity information, and the bottle-neck of the RAID 4 architecture is eliminated. An example of a RAID 5 system is described in U.S. Pat. No. 4,914,656 to Clark et al.

As in a RAID 4 system, a limitation of a RAID 5 system is that a change in a data block requires a Read-Modify-Write sequence comprising two Read and two Write operations: an old parity (OP) block and old data (OD) block must be read and XOR'd, and the resulting sum must then be XOR'd with the new data. Both the data and the parity blocks then must be rewritten to the disk drives. While the two Read operations may be done in parallel, as can the two Write operations, modification of a block of data in a RAID 4 or a RAID 5 system still takes substantially longer then the same operation on a conventional disk. A conventional disk does not require the preliminary Read operation, and thus does not have to wait for the disk drives to rotate back to the previous position in order to perform the Write operation. The rotational latency time alone can amount to about 50% of the time required for a typical data modification operation in a RAID 5 system. Further, two disk storage units are involved for the duration of each data modification operation, limiting the throughput of the system as a whole.

FIG. 1 is block diagram of a generalized RAID 4 system in accordance with the prior art. Shown is a Central Processing Unit (CPU) 1 coupled by a bus 2 to an array controller 3. The array controller 3 is coupled in a RAID 4 configuration to each of the plurality of failure-independent storage units S1-S4 (four being shown by way of example only) and a parity storage unit 4 by an I/O bus 5 (e.g., a SCSI bus).

FIG. 2 shows a high-level flow chart of the steps which must be taken to write a new data (ND) block onto one storage unit of a redundancy array of the type shown in FIG. 1. A typical RMW sequence begins by reading the OD block which will be rewritten by the ND block from one of the four storage units S1-S4 (step 200). The OD block is then transmitted from the storage unit to a controller (step 201). The corresponding old parity (OP) block must then be read from the parity storage unit (step 202) and transmitted to the controller (step 203). Once the OD block and the OP block are present in the controller, they are XOR'd to remove the information content of the OD block from the OP block. The ND block is XOR'd with the XOR sum of the OD block and the OP block to create a new parity (NP) block (step 204). The NP block is then transmitted to (step 205) and Written to (step 206) the parity storage unit. The ND block is then transmitted to (step 207) and Written to (step 208) the storage unit from which the OD block was Read and thereby overwrites the OD block.

The entire RMW sequence requires a total of two Read operations, two Write operations, two XOR operations, and four transmissions between the storage units and the controller.

Due in large part to the amount of time required to initiate and complete a transmission of a block of data between a storage unit and the controller, the RMW sequence takes longer than is desirable. Additionally, even when the two Read operations are done in parallel and the two Write operations are done in parallel, both the storage unit which holds the data and the storage unit which holds the parity information are unavailable for subsequent RMW sequences which could otherwise be started concurrent with a portion of the previous RMW sequence.

For example, in a RAID 5 configuration, assume that one record to be modified is stored in S1 and the associated parity information is stored in S2. A second record which is to be modified is stored in S2 and the associated parity information is stored in S3. Because S2 must be accessed during the modification of the record stored in S1, the present art does not teach how to begin a parallel RMW operation to modify the data stored in S2 until completion of the RMW operation being performed on the data in S1.

The most efficient way to utilize the storage units is to allow each unit to be accessed as soon as it is free to reduce the sum of the time that both storage units involved in a particular RMW operation are unavailable for other RMW operations.

It is therefore desirable to reduce the number of operations, and particularly the number of transmissions between storage units and the controller, which must be performed in the RMW sequence. The present invention provides such a method.

SUMMARY OF THE INVENTION

The present invention is a redundant array storage system in which each parity storage unit generates its own redundancy information. When a new data (ND) block is to be stored on a data storage unit within the redundant array, the ND block is first transmitted from a Central Processor Unit (CPU) to an array controller. In a first embodiment of the invention, an old data (OD) block, which is to be overwritten by the ND block, is Read and transmitted to the array controller. The OD block and the ND block are then transmitted to the corresponding parity storage unit. Within the parity storage unit, the OP block corresponding to the OD block is Read, and the OD block, the OP block, and the ND block are Exclusive OR'd (XOR'd) in the preferred embodiment to create a new parity (NP) block. This NP block is then stored on the parity storage unit without the need for a transfer of either the OP block or the NP block between the controller and the parity storage unit. Meanwhile, the ND block is also transmitted from the array controller to the storage unit onto which it is intended to be stored. This sequence requires only three transfers between the array controller and the various storage units of the redundancy array, thereby increasing the speed at which a RMW sequence can be accomplished.

In a second embodiment of the invention, the ND block and the OD block are XOR'd within the array controller, and the sum is then transmitted to the appropriate parity storage unit. After transmission of this partial sum to the parity storage unit, the partial sum is XOR'd with the OP block to create the NP block.

Thus, this embodiment trades off the time required to compute the XOR sum within the array controller against time required to transmit two blocks rather than one block.

The invention reduces the number of data transfers between the storage units and the array controller by 25%, thereby increasing the speed of RMW sequences. In addition, the invention reduces input/output (I/O) initiation time by 25%, and reduces the computational overhead otherwise incurred by the array controller.

Additional improvements in performance are attained when the storage device is a disk drive unit having two read/write heads. In such a storage unit in which parity information is stored, a first head reads the OP block. The OP block, the OD block, and ND block are XOR'd as the position on the media at which the OP block was stored is rotating from the first head to the second head. By the time the media reaches the second head, the NP block is ready to be written, saving the additional amount of time that it would have taken to return to the first head.

Further aspects of the present invention will become apparent from the following detailed description when considered in conjunction with the accompanying drawings. It should be understood, however, that the detailed description and the specific examples, while representing the preferred embodiment of the invention, are given by way of illustration only.

BRIEF DESCRIPTION OF THE DRAWINGS

Like reference numbers and designations in the drawings refer to like elements.

DETAILED DESCRIPTION OF THE INVENTION

Throughout this description, the preferred embodiment and examples shown should be considered as exemplars, rather than limitations on the method of the present invention.

Figure 1:
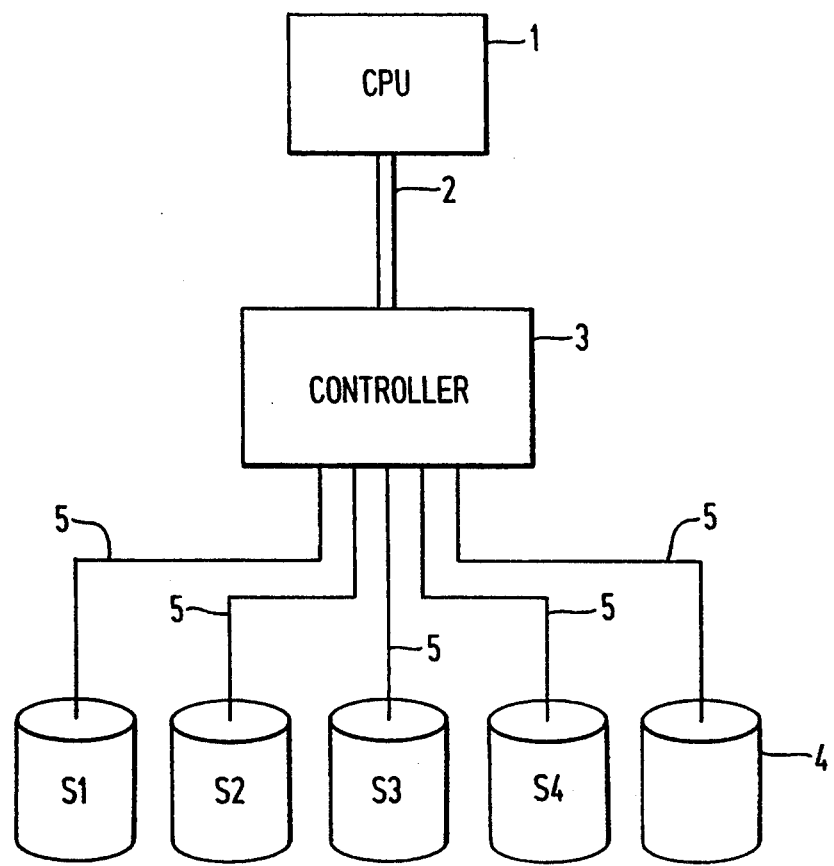
FIG. 1 is block diagram of a generalized prior art RAID system.
Figure 2:
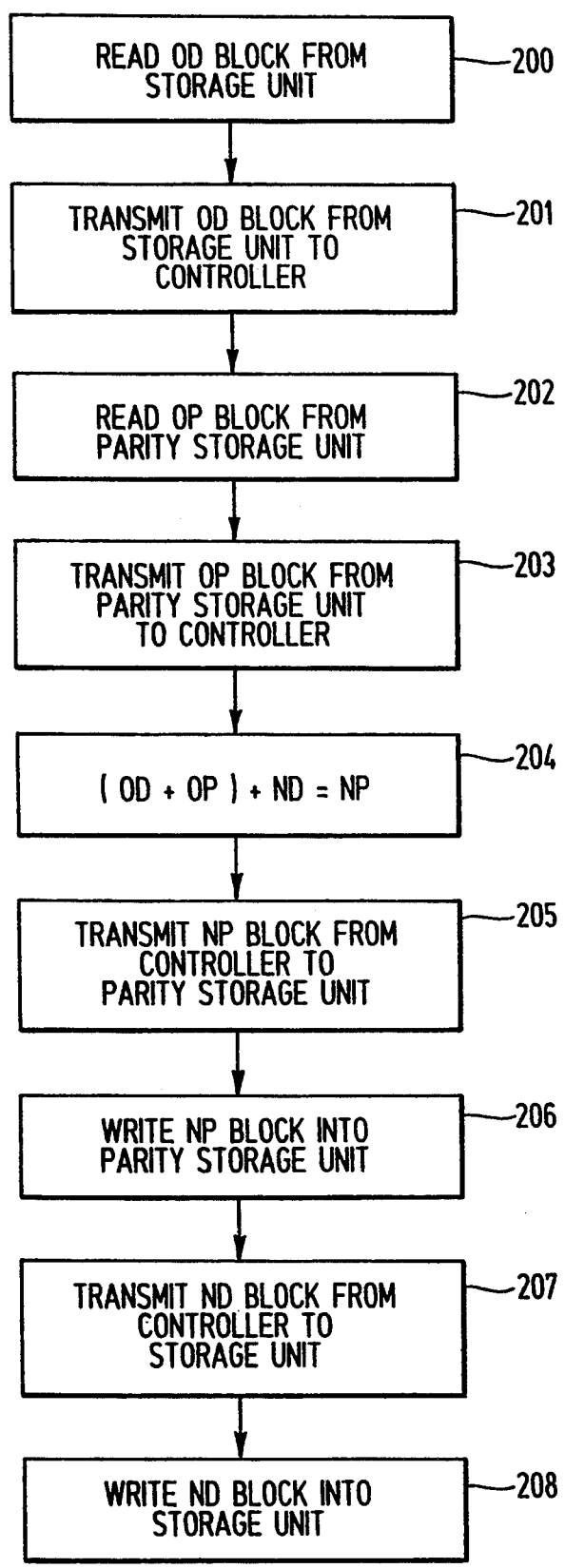
FIG. 2 is a high level flow chart of a prior art Read-Modify-Write sequence.
Figure 3:
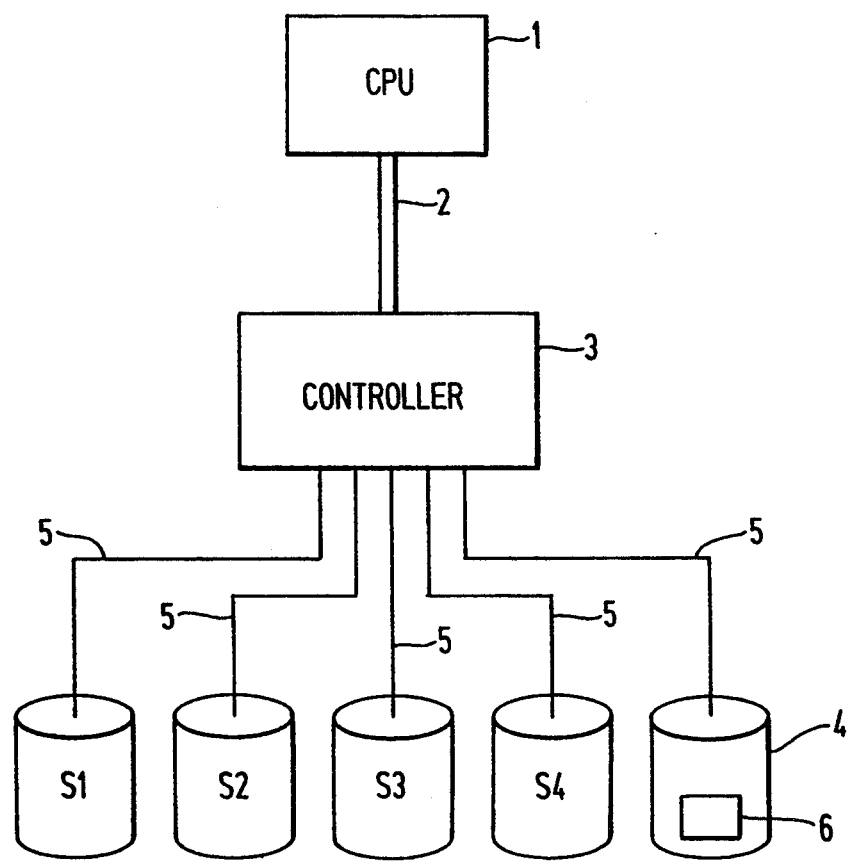
FIG. 3 is a block diagram of a generalized RAID system in accordance with the present invention.

FIG. 3 is block diagram of a generalized RAID 4 system in accordance with the present invention. Shown is a Central Processing Unit (CPU) 1 coupled by a bus 2 to an array controller 3. In the embodiment shown, the array controller 3 is coupled in a RAID 3 or RAID 4 configuration to each of a plurality of storage units S1–S4 (four being shown by way of example only) and an error correction storage unit, such as a parity storage unit 4, by an I/O bus 5 (e.g., a SCSI bus). The array controller 3 preferably includes a separately programmable, multi-tasking processor (for example, the MIPS R3000 RISC processor, made by MIPS Corporation of Sunnyvale, Calif.) which can act independently of the CPU 1 to control the storage units S1–S4, and the parity storage unit 4.

The parity storage unit 4 is preferably implemented as a smart storage unit containing a processor 6 (for example, the HP97556 5¼" SCSI disk drive), the program of which can be altered to allow tasks to be performed which lie outside the realm of what is necessary for simply reading and writing data.

In the present invention as shown, a multi-tasking computer program is executed by the array controller 3 in concert with a computer program executed by the independent processor 6 within the parity storage unit 4. However, numerous combinations of software routines performed by the processors within the array controller 3, the CPU 1, the storage units S1-S4 and the parity storage unit 4 are possible to achieve the desired result. In particular, each of the storage units S1-S4 may include a processor 6, such that all of the storage units may be configured as a RAID 5 system. A RAID 3/RAID 4 configuration is shown in FIG. 3 only for the sake of ease of understanding.

When a new data (ND) block is to be written to one of the storage units S1-S4, the ND block is transmitted from the CPU 1 via the bus 2 to the array controller 3. After receipt of an ND block at the array controller 3, the inventive process begins.

Figure 4:
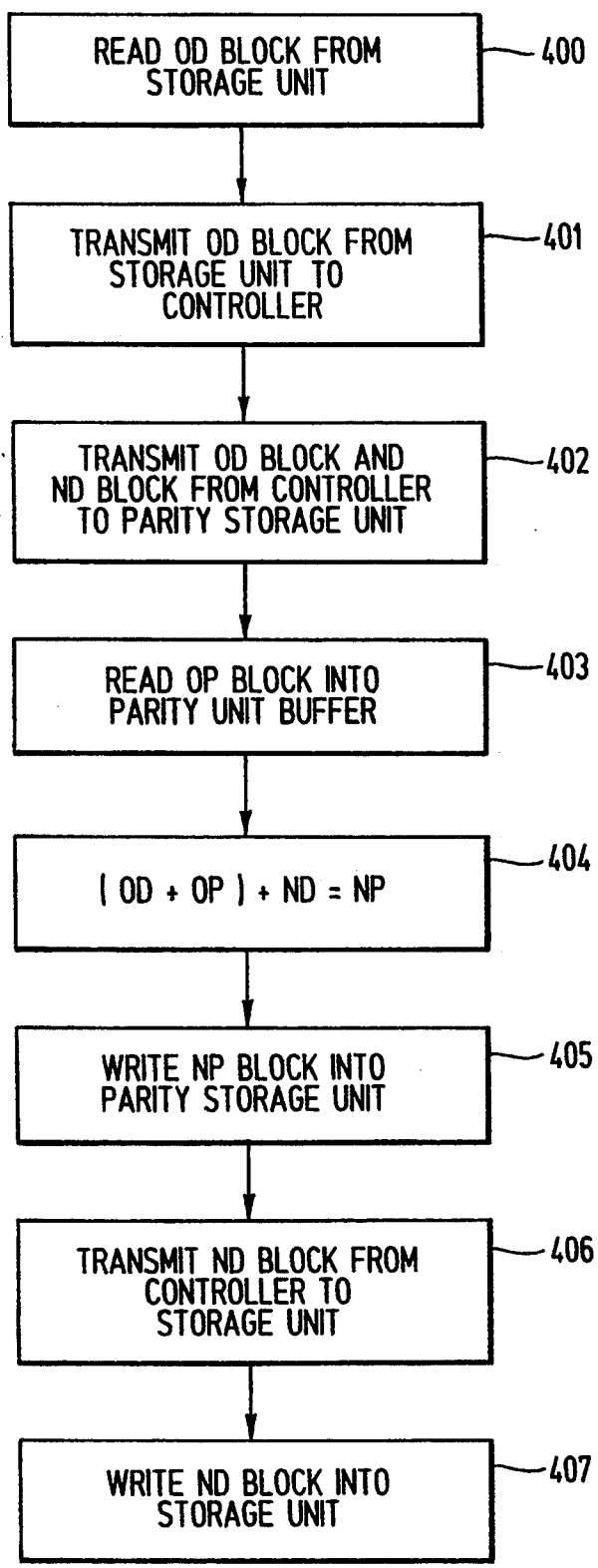
FIG. 4 is a high level flow chart of the RMW sequence of the first embodiment of the present invention.

FIG. 4 shows a high-level flow chart of a first embodiment of the process that is implemented in the multi-tasking processor of the array controller 3 and the processor 6 of the appropriate parity storage unit 4. In the first step, the OD block to be overwritten by the ND block is Read from the appropriate storage unit S1-S4 (step 400).

Once the OD block is Read it is transmitted to the array controller 3 (step 401). The OD block is then retransmitted along with the ND block in a single transmission from the array controller 3 to the parity storage unit 4 (step 402). Transferring the OD block and the ND block in a single transmission saves the processing overhead which is required to initiate a transmission for each block of data independently. An old error correction code block, which for the purposes of this description is an old parity (OP) block, corresponding to the OD block, is then Read into a buffer within the processor 6 of the parity storage unit 4 (step 403).

Upon receipt of the OD block and the ND block, the internal processor 6 performs an Exclusive OR (XOR) function on the OD block, OP block, and the ND block to generate a new parity (NP) block (step 404). The NP block is then Written to the parity storage unit 4 (step 405), and so replaces the OP block. Concurrently, the ND block is transmitted to the storage unit S1-S4 from which the OD was Read (step 406), and written therein (step 407).

The invention, therefore, requires only three transmissions of data between the array controller 3 and the various storage units S1-S4 and the parity storage unit 4, rather than four transmissions as in the prior art. Because the parity storage unit 4 is involved in only a single data transmission, it becomes rapidly available for the next RMW operation. Furthermore, it is generally possible for a disk-type parity unit 4 to receive the ND and OD blocks, then Read each corresponding OP block and generate the NP block before a complete rotation of the disk media occurs. This allows the NP block to be computed and Written within slightly more than one revolution of the media.

In contrast, in the prior art, after an OP block is Read and transmitted to the array controller 3, the computed NP block from the array controller 3 may not be received in time (due to transmittal overhead in both directions) to be Written over the OP block without being delayed for more revolutions.

Figure 6:
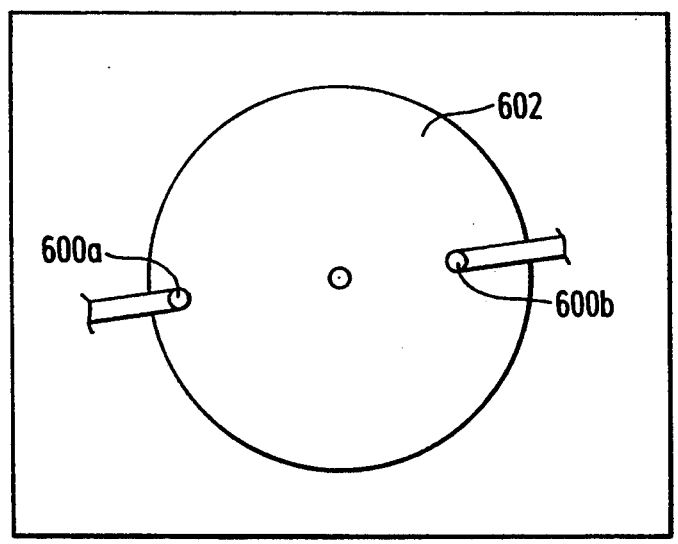
FIG. 6 is an illustration of a disk drive unit with two read/write heads.

Furthermore, a disk-type parity unit may have more than one read/write head 600 per storage media surface (see FIG. 6). Having two read/write heads reduces the rotational latency time (i.e., the time required to rotate to the position at which the data is stored). Each of the two heads are preferably positioned 180° around the storage media and each may read and/or write simultaneously. Magnetic disk drives having such a configuration are available from Conner Peripherals as its "Chinook" 510 megabyte drive.

In such a disk-type parity unit, a first read/write head 600a reads the OP block. The parity unit then generates the NP block before the disk media 602 rotates past a second read/write head 600b. Therefore the NP block is computed and Written in less than a single rotation of the media 602. The placement of the read/write heads 600a, 600b with respect to one another depends upon the speed with which the NP block can be generated from the OP block, the OD block, and the ND block, and the speed at which the media 602 rotates. In an alternative embodiment, any even number of heads 600 may be used.

In addition to decreasing the overall time required to overwrite the OP block with the NP block, the overall time required for the data storage unit which stores the OD block to Read the OD block and Write the ND block can also be reduced by using more than one read/write head 600. In such a configuration, one head 600a Reads the OD block, and a second head 600b Writes the ND block at the same location on the media 602 from which the OD block was Read. Use of at least two read/write heads 600a, 600b increases the speed at which a disk storage unit overwrites the OD block with the ND block since the media rotates less than one rotation between Reading the OD and Writing the ND.

While the above described embodiments of the present invention is illustrated as being used in a RAID 3 or RAID 4 system for ease of understanding, it should be noted that this embodiment may also be used in a RAID 5 system.

Figure 5:
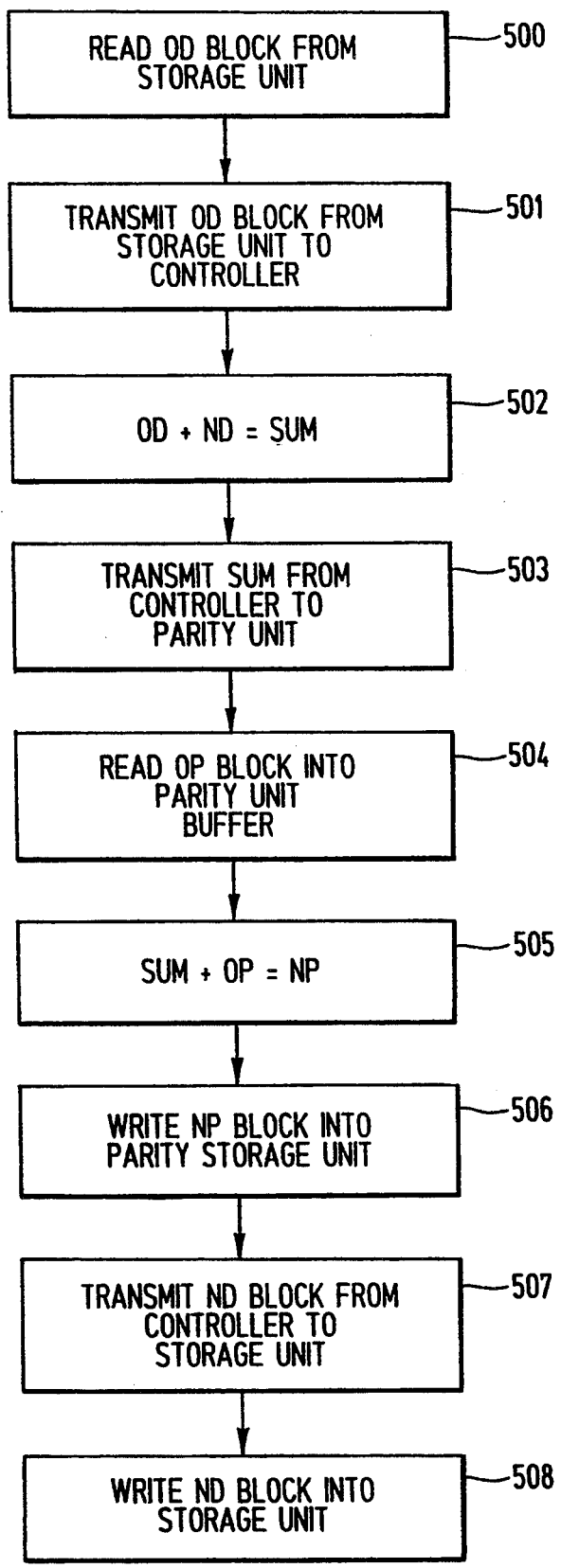
FIG. 5 is a high level flow chart of the RMW sequence of the second embodiment of the present invention.

A second embodiment of the invention is shown in FIG. 5, which is a high level flow chart. In this embodiment, the OD block is read (step 500) and transmitted to the array controller 3 (step 501), as is the case in the first embodiment. However, upon receiving the OD block, the array controller 3 performs a first XOR operation upon the OD block and the ND block (step 502), creating a SUM block. The SUM block is then transmitted to the parity storage unit 4 (step 503). After the parity storage unit 4 receives the SUM block, the OP block is Read into a parity buffer within the processor 6 of the parity storage unit (step 504). The SUM block is then XOR'd with the OP block by the internal processor 6 to form the NP block (step 505), which is then Written to the parity storage unit 4 (step 506). The ND block is concurrently transmitted to the corresponding storage unit S1-S4 from which the OD block was Read and to which the ND block is to be Written (step 507). The ND block is then Written to the selected storage unit (step 508), and the operation is completed.

By sending the sum of the OD and ND blocks rather than the OD block and the ND block themselves, the total time for the transmission between the array controller 3 and the parity storage unit 4 is reduced. This results in a favorable trade-off between the time required to compute the SUM block within the array control unit and the time required to transmit two blocks rather than one block.

In the embodiment in which the disk-type parity units have at least two read/write heads 600a, 600b, as shown in FIG. 6, the internal processor in the parity unit generates the NP block from the OP block and the SUM block before the storage media 602 rotates from the first head 600a to the second head 600b. This results in an improvement in performance from the simultaneous Read and Write operations of the two read/write heads 600a, 600b, and a consequent reduction in the rotational latency time as noted above.

It will be understood that various modifications may be made without departing from the spirit and scope of the invention. For example, the present invention can be used with RAID 3, RAID 4, or RAID 5 systems. Furthermore, an error correction method other than XOR-generated parity may be used for the necessary redundancy information. One such method using Reed-Solomon codes is disclosed in U.S. patent application Ser. No. 270,713, filed Nov. 14, 1988, entitled "Array Disk Drive System and Method" and assigned to the assignee of the present invention. Thus, as used herein, "parity" should be understood to also include the broader concept of "redundancy information". The invention can use non-XOR redundancy information in addition to or in lieu of XOR-generated parity. As another example, the invention can be used in an array system configured to attach to a network rather than directly to a CPU. Accordingly, it is to be understood that the invention is not to be limited by the specific illustrated embodiment, but only by the scope of the appended claims.

I claim:

1. A redundant storage array system comprising an array controller for receiving a write command, and a plurality of failure independent data storage units for storing data and redundancy information in the form of blocks, wherein at least one of the storage units includes a local processing means for locally generating and locally storing a new redundancy block derived from a corresponding new data block, a corresponding old data block, and a corresponding old redundancy block by combining the old data block, the new data block, and the old redundancy block within the local processing means.

2. The redundant storage array system of claim 1, wherein each local processing means further includes means for:
   a. receiving an old data block and a new data block in a single transmission;
   b. reading an old redundancy block previously stored in the storage unit associated with the processing means, the old redundancy block corresponding to the old data block; and
   c. storing the new redundancy block in the storage unit associated with the processing means.

3. The redundant storage array system of claim 2, wherein:
   a. the old redundancy block is an old parity block;
   b. the new redundancy block is a new parity block; and
   c. the processing means further includes means for generating the new parity block by an exclusive-OR operation performed on the old data block, the new data block, and the old parity block.

4. The redundant storage array system of claim 1, wherein the redundancy information is generated using a Reed-Solomon code.

5. The redundant storage array system of claim 1, further comprising an array controller coupled to the plurality of failure independent data storage units, wherein the array controller includes a control means for:
   a. receiving the new data block from a central processing unit;
   b. receiving the old data block from a first data storage unit;
   c. transmitting the new data block to the first data storage unit; and
   d. transmitting the new data block and the old data block in a single transmission to a second data storage unit, the second data storage unit having a local processing means.

6. The redundant storage array system of claim 5, wherein:
   a. the old redundancy block is an old parity block;
   b. the new redundancy block is a new parity block; and
   c. the processing means further includes means for generating the new parity block by an exclusive-OR operation performed on the old data block, the new data block, and the old parity block.

7. The redundant storage array system of claim 2, further including an array controller coupled to the plurality of failure independent data storage units, wherein the array controller includes a control means for:
   a. receiving the new data block;
   b. receiving the old data block from a first data storage unit;
   c. transmitting the new data block to the first data storage unit; and
   d. transmitting the new data block and the old data block in a single transmission to a second data storage unit, the second data storage unit having a local processing means.

8. The redundant storage array system of claim 7, wherein:
   a. the old redundancy block is an old parity block;
   b. the new redundancy block is a new parity block; and
   c. the processing means further includes means for generating the new parity block by an exclusive-OR operation performed on the old data block, the new data block, and the old parity block.

9. The redundant storage array system of claim 1, wherein the processing means further includes means for:
   a. receiving a sum block generated from the new data block and the old data block; and
   b. reading an old redundancy block previously stored in the storage unit associated with the processing means, the old redundancy block corresponding to the old data block;

and wherein the new redundancy block is locally generated from the sum block and the old redundancy block.

10. The redundant storage array system of claim 9, wherein:
   a. the old redundancy block is an old parity block;
   b. the new redundancy block is a new parity block; and
   c. the processing means for generating the new parity block further includes means for performing an exclusive-OR operation upon the sum block and the old parity block.

11. The redundant storage array system of claim 9, further including an array controller coupled to a central processing unit and the plurality of failure independent data storage units, wherein the array controller includes a control means for:
   a. receiving the new data block from a central processing unit;
   b. receiving the old data block from a first data storage unit;
   c. transmitting the new data block to the first data storage unit;
   d. generating the sum block from the old data block and the new data block; and
   e. transmitting the sum block to a second data storage unit having a local processing means.

12. The redundant storage array system of claim 11, wherein:
   a. the old redundancy block is an old parity block;
   b. the new redundancy block is a new parity block;
   c. the control means further includes means for generating the sum block by an exclusive-OR operation performed on the old data block and the new data block; and
   d. the processing means further includes means for generating the new parity block by an exclusive-OR operation performed on the sum block and the old parity block.

13. The redundant storage array system of claim 1, further including an array controller coupled to the plurality of failure independent data storage units, wherein the array controller includes a control means for:
   a. receiving the new data block from a central processing unit;
   b. receiving the old data block from a first data storage unit;
   c. generating a sum block from the new data block and the old data block;
   d. transmitting the sum block to a second data storage unit having a local processor; and
   e. transmitting the new data block to the first data storage unit; wherein the new redundancy block is locally generated from the sum block and the old redundancy block.

14. The redundant storage array system of claim 13, wherein:
   a. the old redundancy block is an old parity block;
   b. the new redundancy block is a new parity block;
   c. the control means further includes means for generating the sum block by an exclusive-OR operation performed on the old data block and the new data block; and
   d. the processing means further includes means for generating the new parity block by an exclusive-OR operation performed on the sum block and the old parity block.

15. In a redundant storage array system including an array controller for receiving a write command, and a plurality of failure independent data storage units in which at least one data storage unit includes a local processing means for creating redundancy blocks, a method for improving the generation of redundancy information and the storage of data and redundancy information, including the step of locally generating and locally storing a new redundancy block derived from a corresponding new data block, a corresponding old data block, and a corresponding old redundancy block by combining the old data block, the new data block, and the old redundancy block within the local processing means.

16. The method of claim 15, wherein the generation and storing of a new redundancy block includes the steps of:
   a. receiving, in a single transmission, the old data block and the new data block into a first data storage unit, the first data storage unit having a local processing means;
   b. reading the old redundancy block corresponding to the old data block from the first data storage unit;
   c. creating the new redundancy block from the old data block, the new data block, and the old redundancy block;
   d. storing the new redundancy block in the first data storage unit; and
   e. storing the new data block in a second data storage unit.

17. The method of claim 16, wherein:
   a. the old redundancy block is an old parity block;
   b. the new redundancy block is a new parity block;
   c. an exclusive-OR operation is used to generate the new parity block from the old data block, the new data block, and the old parity block.

18. The method of claim 15, wherein the redundancy information is generated using a Reed-Solomon code.

19. In a redundant storage array system including an array controller for receiving a write command, and a plurality of failure independent data storage units for storing data and redundancy information in the form of blocks, at least one of the storage units including a local processing means for creating error correction code blocks, a method for improving the generation of redundancy information and the storage of data and redundancy information, including the steps of:
   a. reading an old data block from a first data storage unit;
   b. receiving a sum block which is a composite of a new data block and the old data block in a second data storage unit, the second data storage unit having a processing means for creating error correction code blocks;
   c. reading an old error correction code block corresponding to the old data block from the second data storage unit;
   d. creating a new error correction code block within the second data storage unit from the old error correction code block and the sum block;
   e. storing the new error correction code block in the second data storage unit; and
   f. storing the new data block in the first data storage unit.

20. The method of claim 19, further including the step of generating a sum block within an array controller by an exclusive-OR operation performed upon the old data block and the new data block.

21. The method of claim 19, wherein:
   a. the old error correction code block is an old parity block;
   b. the new error correction code block is a new parity block;
   c. the sum block is generated by an exclusive-OR operation performed upon the old data block and the new data block; and
   d. the new parity block is generated by an exclusive-OR operation performed upon the old parity block and the sum block.

22. The method of claim 19, wherein the redundancy information is generated using a Reed-Solomon code.

23. A redundant storage array system comprising an array controller for receiving a write command, and a plurality of failure independent data storage units for storing data and redundancy information in the form of blocks, wherein:
   a. at least one of the storage units is a disk-type storage unit including:
      (1) a plurality of read/write means, at least one read/write means for reading data from the storage unit and at least one read/write means for writing data to the storage unit; and
      (2) a local processing means for locally generating and locally storing a new redundancy block derived from a corresponding new data block, a corresponding old data block, and a corresponding old redundancy block by combining the old data block, the new data block, and the old redundancy block within the local processing means.

24. The redundant storage array system of claim 23, wherein each local processing means further includes means for:
   a. receiving an old data block and a new data block in a single transmission;
   b. reading an old redundancy block previously stored in the storage unit associated with the processing means with the first read/write means, the old redundancy block corresponding to the old data block; and
   c. writing the new redundancy block in the storage unit associated with the processing means with the second read/write means.

25. The redundant storage array system of claim 24, wherein:
   a. the old redundancy block is an old parity block;
   b. the new redundancy block is a new parity block; and
   c. the processing means further includes means for generating the new parity block by an exclusive-OR operation performed on the old data block, the new data block, and the old parity block.

26. The redundant storage array system of claim 23, wherein the redundancy information is generated using a Reed-Solomon code.

27. The redundant storage array system of claim 23, further comprising an array controller coupled to the plurality of failure independent data storage units, wherein the array controller includes a control means for:
   a. receiving the new data block from a central processing unit;
   b. receiving the old data block from a first data storage unit;
   c. transmitting the new data block to the first data storage unit; and
   d. transmitting the new data block and the old data block in a single transmission to a second data storage unit, the second data storage unit having a local processing means.

28. The redundant storage array system of claim 27, wherein:
   a. the old redundancy block is an old parity block;
   b. the new redundancy block is a new parity block; and
   c. the processing means further includes means for generating the new parity block by an exclusive-OR operation performed on the old data block, the new data block, and the old parity block.

29. The redundant storage array system of claim 24, further including an array controller coupled to the plurality of failure independent data storage units, wherein the array controller includes a control means for:
   a. receiving the new data block;
   b. receiving the old data block from a first data storage unit;
   c. transmitting the new data block to the first data storage unit; and
   d. transmitting the new data block and the old data block in a single transmission to a second data storage unit, the second data storage unit having a local processing means.

30. The redundant storage array system of claim 29, wherein:
   a. the old redundancy block is an old parity block;
   b. the new redundancy block is a new parity block; and
   c. the processing means further includes means for generating the new parity block by an exclusive-OR operation performed on the old data block, the new data block, and the old parity block.

31. The redundant storage array system of claim 23, wherein the processing means further includes means for:
   a. receiving a sum block generated from the new data block and the old data block; and
   b. reading an old redundancy block previously stored in the storage unit associated with the processing means with the first read/write means, the old redundancy block corresponding to the old data block;

and wherein the new redundancy block is locally generated from the sum block and the old redundancy block and written with the second read/write means to the storage means associated with the processing means.

32. The redundant storage array system of claim 31, wherein:
   a. the old redundancy block is an old parity block;
   b. the new redundancy block is a new parity block; and
   c. the processing means for generating the new parity block further includes means for performing an exclusive-OR operation upon the sum block and the old parity block.

33. The redundant storage array system of claim 31, further including an array controller coupled to a central processing unit and the plurality of failure independent data storage units, wherein the array controller includes a control means for:
   a. receiving the new data block from a central processing unit;
   b. receiving the old data block from a first data storage unit;
   c. transmitting the new data block to the first data storage unit;
   d. generating the sum block from the old data block and the new data block; and
   e. transmitting the sum block to a second data storage unit having a local processing means.

34. The redundant storage array system of claim 33, wherein:
   a. the old redundancy block is an old parity block;
   b. the new redundancy block is a new parity block;

c. the control means further includes means for generating the sum block by an exclusive-OR operation performed on the old data block and the new data block; and d. the processing means further includes means for generating the new parity block by an exclusive-OR operation performed on the sum block and the old parity block.

35. The redundant storage array system of claim 23, further including an array controller coupled to the plurality of failure independent data storage units, wherein the array controller includes a control means for:

a. receiving the new data block from a central processing unit;

b. receiving the old data block from a first data storage unit;

c. generating a sum block from the new data block and the old data block;

d. transmitting the sum block to a second data storage unit having a local processor; and e. transmitting the new data block to the first data storage unit;

wherein the new redundancy block is locally generated from the sum block and the old redundancy block.

36. The redundant storage array system of claim 35, wherein:

a. the old redundancy block is an old parity block;

b. the new redundancy block is a new parity block;

c. the control means further includes means for generating the sum block by an exclusive-OR operation performed on the old data block and the new data block; and d. the processing means further includes means for generating the new parity block by an exclusive-OR operation performed on the sum block and the old parity block.

37. In a redundant storage array system including a plurality of failure independent data storage units in which at least one data storage unit includes a local processing means for creating redundancy blocks, at least a first read/write means for reading data from the storage unit, and at least a second read/write means for writing data to the storage unit, a method for improving the generation of redundancy information and the storage of data and redundancy information, including the step of:

a. locally generating a new redundancy block from a corresponding new data block, a corresponding old data block, and a corresponding old redundancy block read by the first read/write means; and b. writing the new redundancy block to the data storage unit with the second read/write means.

38. The method of claim 37, wherein the generation and storing of a new redundancy block includes the steps of:

a. receiving, in a single transmission, the old data block and the new data block into a first data storage unit, the first data storage unit having a local processing means, a first read/write means and a second read/write means;

b. reading with the first read/write means the old redundancy block corresponding to the old data block from the first data storage unit;

c. creating the new redundancy block from the old data block, the new data block, and the old redundancy block;

d. writing with the second read/write means the new redundancy block in the first data storage unit; and e. storing the new data block in a second data storage unit.

39. The method of claim 38, wherein:

a. the old redundancy block is an old parity block;

b. the new redundancy block is a new parity block;

c. an exclusive-OR operation is used to generate the new parity block from the old data block, the new data block, and the old parity block.

40. The method of claim 37, wherein the redundancy information is generated using a Reed-Solomon code.

41. In a redundant storage array system including a plurality of failure independent data storage units for storing data and redundancy information in the form of blocks, at least one of the storage units including a local processing means for creating error correction code blocks, a first read/write means for reading data, and a second read/write means for writing data, a method for improving the generation of redundancy information and the storage of data and redundancy information, including the steps of:

a. reading an old data block from a first data storage unit;

b. receiving a sum block which is a composite of a new data block and the old data block in a second data storage unit, the second data storage unit having a processing means for creating error correction code blocks, a first read/write means for reading data, and a second read/write means for writing data;

c. reading with the first read/write means an old error correction code block corresponding to the old data block from the second data storage unit;

d. creating a new error correction code block within the second data storage unit from the old error correction code block and the sum block;

e. writing with the second read/write means the new error correction code block in the second data storage unit; and f. storing the new data block in the first data storage unit.

42. The method of claim 41, further including the step of generating a sum block within an array controller by an exclusive-OR operation performed upon the old data block and the new data block.

43. The method of claim 41, wherein:

a. the old error correction code block is an old parity block;

b. the new error correction code block is a new parity block;

c. the sum block is generated by an exclusive-OR operation performed upon the old data block and the new data block; and d. the new parity block is generated by an exclusive-OR operation performed upon the old parity block and the sum block.

44. The method of claim 41, wherein the redundancy information is generated using a Reed-Solomon code.

* * * * *